(12) United States Patent
Mattson et al.

(10) Patent No.: US 6,315,344 B1
(45) Date of Patent: Nov. 13, 2001

(54) GRAPPLE POSITIONING DEVICE

(76) Inventors: Randall D. Mattson, 1009 S. Second St., St. Maries, ID (US) 83861; Todd R. Brusell, 4470 Champion Hall, Libby, MT (US) 59923

( * ) Notice: Subject to any disclaimer, the term of this patent is extended or adjusted under 35 U.S.C. 154(b) by 96 days.

(21) Appl. No.: 09/597,658

(22) Filed: Jun. 19, 2000

(51) Int. Cl.[7] ................................................. B66C 1/10
(52) U.S. Cl. ................................. 294/86.41; 414/739
(58) Field of Search .................................. 294/68.23, 88, 294/105, 106, 107, 115, 116, 86.41; 414/732, 738, 739, 729, 742, 743; 37/460

(56) References Cited

U.S. PATENT DOCUMENTS

| | | | |
|---|---|---|---|
| 2,870,925 | 1/1959 | Bernad et al. | 414/732 |
| 3,946,882 | * 3/1976 | Koch | 294/106 |
| 4,017,114 | * 4/1977 | LaBounty | 294/88 |
| 4,030,625 | * 6/1977 | Kochnen | 414/739 |
| 4,104,792 | * 8/1978 | LaBounty | 414/732 |
| 4,242,037 | 12/1980 | Baumgarten | 414/739 |
| 4,248,471 | * 2/1981 | LaBounty | 294/88 |
| 4,405,281 | 9/1983 | Ruttershoff | 414/722 |
| 4,413,945 | * 11/1983 | LaBounty | 414/739 |
| 4,426,110 | 1/1984 | Mitchell et al. | 294/88 |
| 4,761,113 | * 8/1988 | Smith et al. | 414/732 |
| 4,907,356 | 3/1990 | Labounty | 37/406 |
| 4,925,359 | * 5/1990 | Dunnegan | 414/732 |
| 4,951,990 | * 8/1990 | Holland et al. | 294/86.41 |
| 4,958,981 | * 9/1990 | Uchihashi | 294/86.41 |
| 5,150,936 | * 9/1992 | Avery | 294/88 |
| 5,330,242 | 7/1994 | Lucky, Sr. | 294/88 |
| 5,472,308 | 12/1995 | Somero | 414/724 |
| 5,584,646 | * 12/1996 | Lewis et al. | 414/738 |
| 5,607,251 | 3/1997 | Rafn | 403/348 |
| 5,620,298 | 4/1997 | Barwise | 414/348 |
| 5,865,492 | 2/1999 | Horton | 294/86.41 |
| 5,983,535 | * 11/1999 | Kaczmarski et al. | 37/468 |
| 6,123,501 | * 9/2000 | Pisco | 414/723 |
| 6,154,989 | * 12/2000 | Kaczmarski et al. | 37/444 |

FOREIGN PATENT DOCUMENTS

3004462 * 8/1981 (DE) ........................................ 294/88

* cited by examiner

Primary Examiner—Eileen D. Lillis
Assistant Examiner—Paul T. Chin
(74) Attorney, Agent, or Firm—Wells, St. John, Roberts, Gregory & Matkin, P.S.

(57) ABSTRACT

A grapple positioning device is described for attachment to a grapple and boom, wherein the grapple is pivotably mounted to an end of the boom. The device includes an extensible ram mountable to the boom and extending to a pusher plate. A follower is mountable to the grapple, and the ram is operable to extend and move the pusher plate against the follower and thereby pivot the grapple away from the boom. The ram is also operable to retract to move the pusher plate in a direction toward the boom and away from the follower.

20 Claims, 7 Drawing Sheets

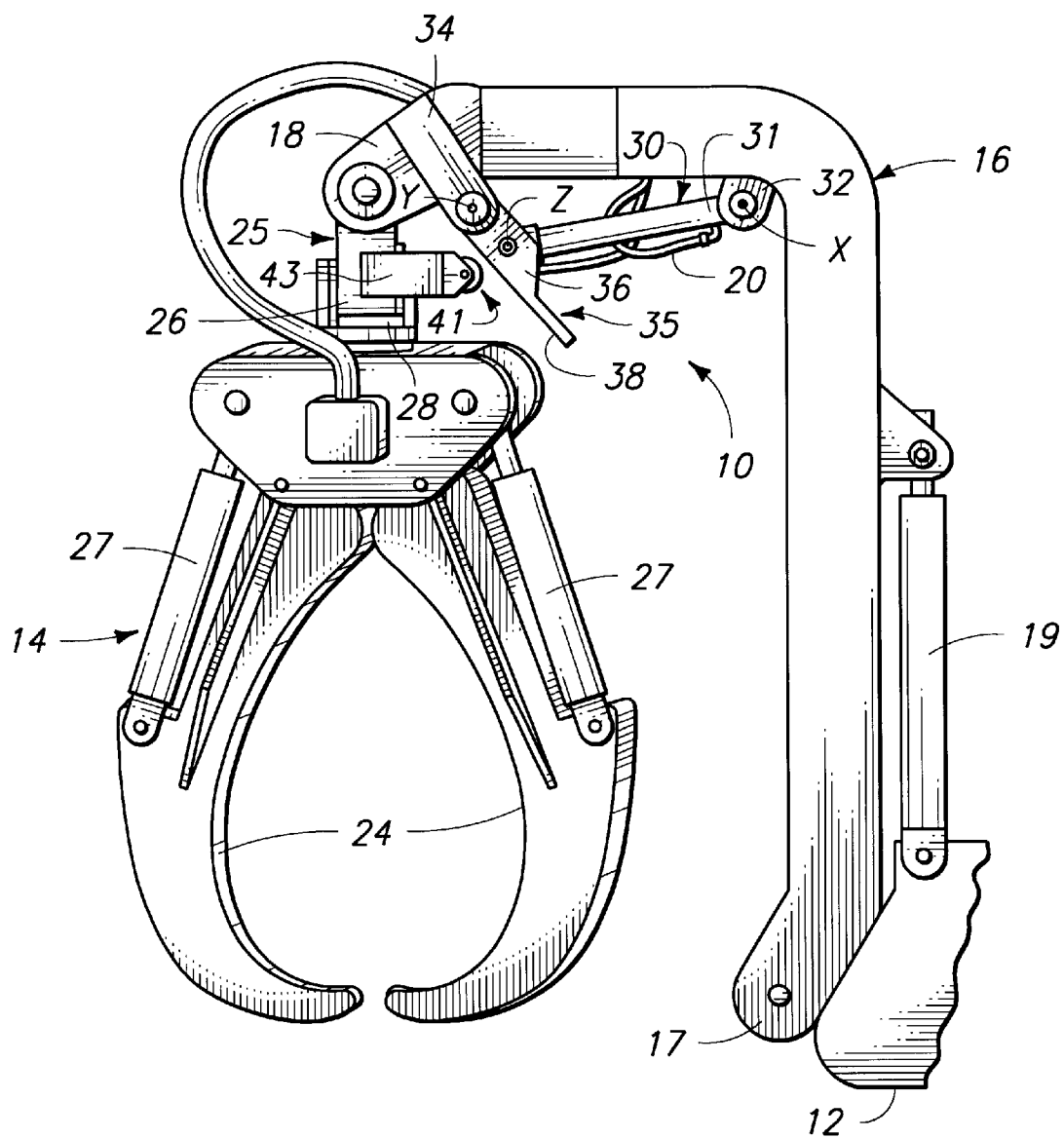

GRAPPLE POSITIONING DEVICE

TECHNICAL FIELD

The present invention relates to positioning of grapples and more particularly to a device that can be made to position a grapple with respect to a boom that mounts the grapple.

BACKGROUND OF THE INVENTION

Logging operations often make use of wheeled or track type vehicles with a boom mounted grapple for grasping stacks of logs and moving the logs to a loading area. The typical grapple is freely pivoted at the end of the boom, and will swing to a substantially vertical position regardless of the angular orientation of the vehicle. This is not a problem in situations where the ends of the logs in the stack are even, and the logs are situated in an easily accessible orientation. However conditions are not always ideal, and situations can arise where the vehicle operator will have a great degree of difficulty in maneuvering the grapple into a position for grasping the stack.

Many operators will have difficulty positioning a grapple on a stack of logs that is on a steep incline. The grapple, being loosely suspended on the boom, will swing to a vertical orientation as the vehicle moves up the incline. Thus the grapple will swing in close to the vehicle. The boom can be lowered to extend the boom reach, but the grapple, being vertical will not reach as far as the boom. Thus the effective reach of the boom is compromised on inclined terrain.

It is an objective of the present invention to provide control of grapple movement toward and away from the grapple so the vehicle operator has a greater degree of control of the grapple position, regardless of the degree of inclination of the vehicle.

It is a further objective to provide a grapple positioning device that may be mounted as a retrofit to existing grapple and boom combinations.

It is a still further objective to provide a grapple positioning device that is easily mounted to a boom and grapple.

It is another objective to provide a grapple positioning device that is simple in construction and inexpensive to maintain and operate.

The above and yet further objects and advantages will become apparent from the following description which, taken with the accompanying drawings, describe a preferred mode for carrying out the present invention.

BRIEF DESCRIPTION OF THE DRAWINGS

Preferred embodiments of the invention are described below with reference to the following accompanying drawings.

FIG. 7 is an enlarged side elevation of the grapple, boom, and grapple positioner with the grapple partially rotated.

DETAILED DESCRIPTION OF THE PREFERRED EMBODIMENTS

Figure 1:
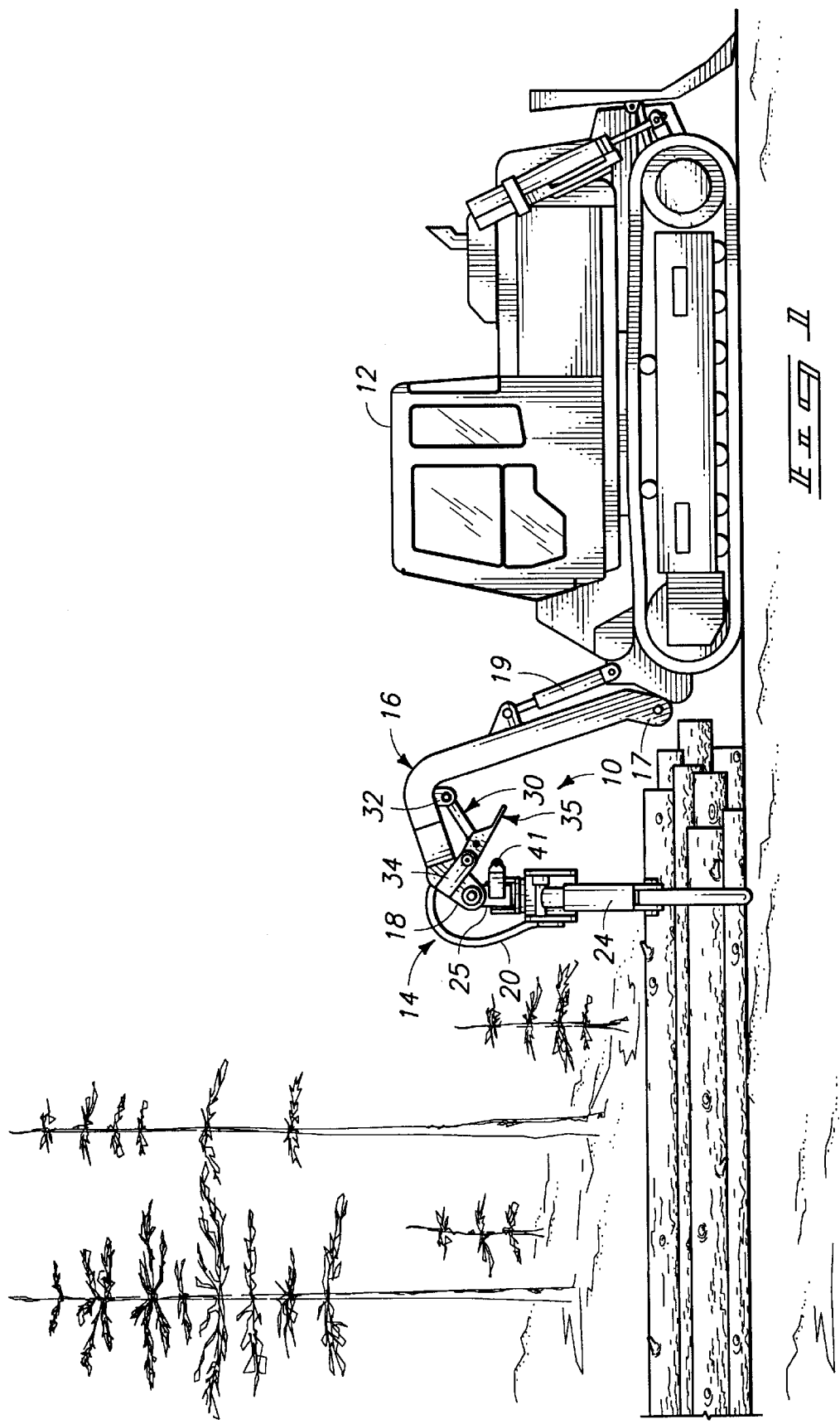
FIG. 1 is a side elevation view of a vehicle, grapple, and a preferred grapple positioner being used to grasp a load of logs.
Figure 2:
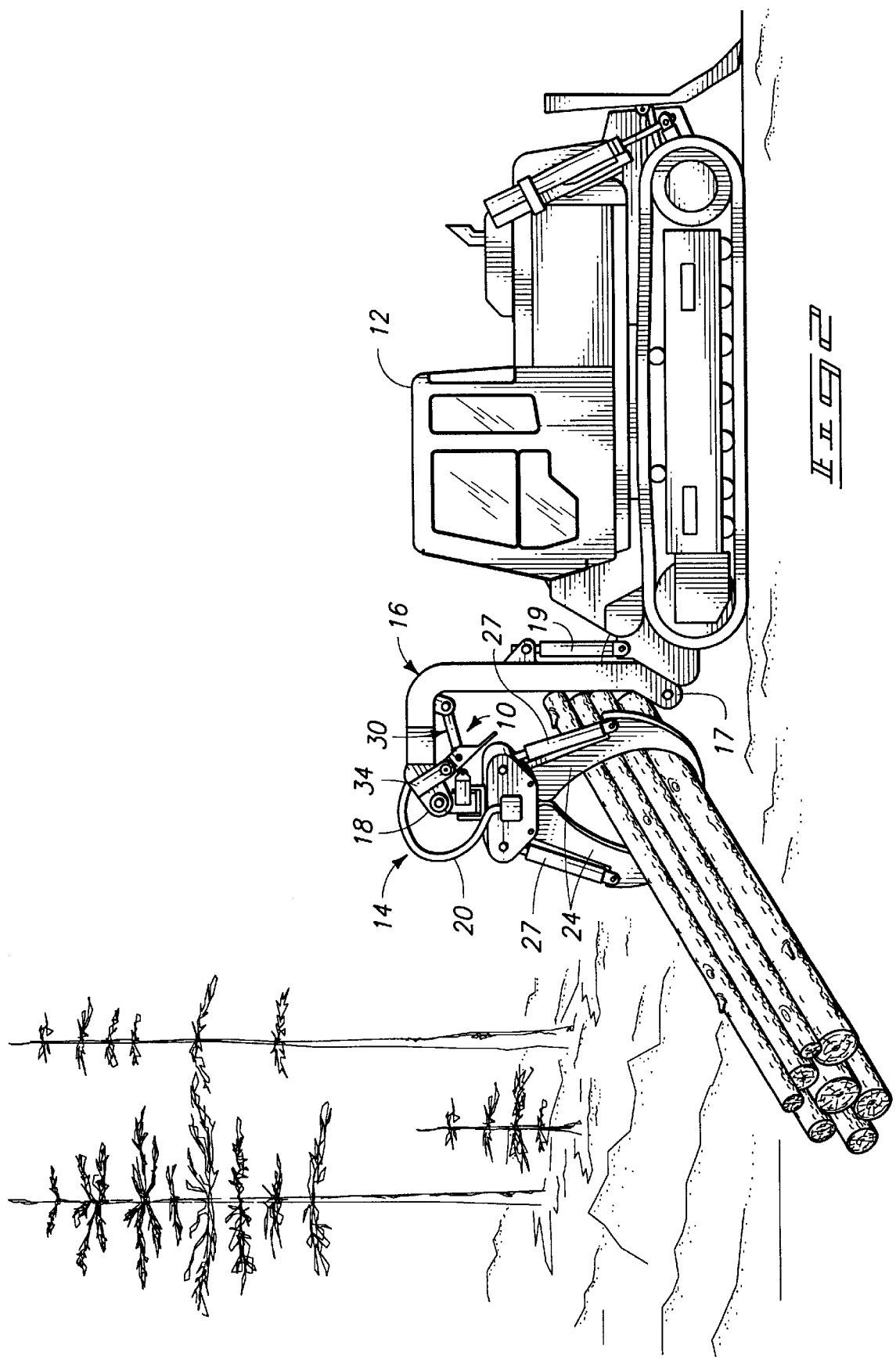
FIG. 2 is similar side elevation view only showing the load at an angle and the grapple rotated according to the angle of the load.

This disclosure of the invention is submitted in furtherance of the constitutional purposes of the U.S. Patent Laws "to promote the progress of science and useful arts" (Article 1, Section 8).

Before providing detailed discussion of elements and features of preferred forms of the present invention, general aspects of the invention will first be described with reference numerals used to identify portions of the preferred forms exemplified in the drawings.

In a first aspect of the invention, a grapple positioning device 10 is provided for attachment to a grapple 14 and boom 16 wherein the grapple 14 is pivotably mounted to an end 18 of the boom 16. The device 10 includes an extensible ram 30 having one end 31 mountable to the boom 16 and extending to a pusher plate 35 at a second end 37. A follower 41 is mountable to the grapple 14. The ram 30 is operable to extend and move the pusher plate 35 against the follower 41 and thereby pivot the grapple 14 outwardly of the boom 16, and to retract to move the pusher plate 35 away from engagement with the follower 41.

In a second aspect of the invention, the grapple positioning device 10 is provided for attachment to a grapple 14 and boom 16 wherein the grapple 14 is mounted to an end 18 of the boom 16 by a pivot link 25. In this aspect, the follower 41 is mountable to the grapple 14 and the extensible ram 30 is mountable at one end 31 to the boom 16 and extends to second end 37. The ram is operable to move the second end 37 in a path between an extended position to engage the follower 41 and a retracted position to disengage the follower 41. The pusher plate 35 is mounted to the second end 37 of the extensible ram 30 whereby extension of the ram 30 causes motion of the pusher plate 35 to engage the follower 41 and pivot the grapple 14 away from the boom 16. Retraction of the ram 30 causes motion of the pusher plate 35 away from engagement with the follower 41.

In a third further aspect of the invention, the grapple positioning device 10 is attached to the grapple 14 and boom 16 wherein the grapple is mounted to end 18 of the boom 26 by pivot link 25. This combination further includes a first bracket 32 mounted to the boom 16 s and defining a first axis X. Extensible ram 30 is mounted at one end 31 to the first bracket 32 for pivotal movement about the first axis X and extends to second end 37. A second bracket 34 is mounted to the boom 26 adjacent to the boom end 18 and defines a second axis Y. Pusher plate 35 is mounted to the second bracket 34 for movement about the second axis Y and includes a mount 36 thereon defining a third axis Z pivotably mounting the second end 37 of the extensible ram 30. Extension and retraction of the ram 30 causes pivotal motion of the pusher plate 35 about the second axis Y between a retracted position disposed angularly about the second axis Y toward the boom 16 and an extended position disposed angularly about the second axis Y away from the boom 16. Follower 41 is mounted to the pivot link 25 and is releasably engageable with the pusher plate 35 to swing the grapple 14 away from the boom 16 in response to pivotal motion of the pusher plate 35 to the extended position.

It is pointed out that in the first two aspects generally described above, the grapple positioning device 10 is provided as a subcombination retrofit unit for attachment to existing booms 16 and grapples 14. In the third aspect, the device is provided in combination with the boom 16 and grapple 14. Thus the present unit may be manufactured and sold as an attachment that may be mounted to a boom and grapple or the boom and grapple may be manufactured as a unit along with the grapple positioning device.

The boom and grapple may be mounted to or supplied with a vehicle such as a tractor 12 as generally shown in FIGS. 1–4 of the drawings. The type of vehicle may vary, as may the mounting location of the boom. In the example shown, the boom is pivotably mounted at end 17 to the rear frame end of the tractor and is pivoted by action of a hydraulic ram 19. The ram 19 and other cylinders used by the grapple and the present device 10 are driven by hydraulic fluid supplied under pressure through a conventional hydraulic system, pressure lines of which are generally indicated at 20.

Figure 3:
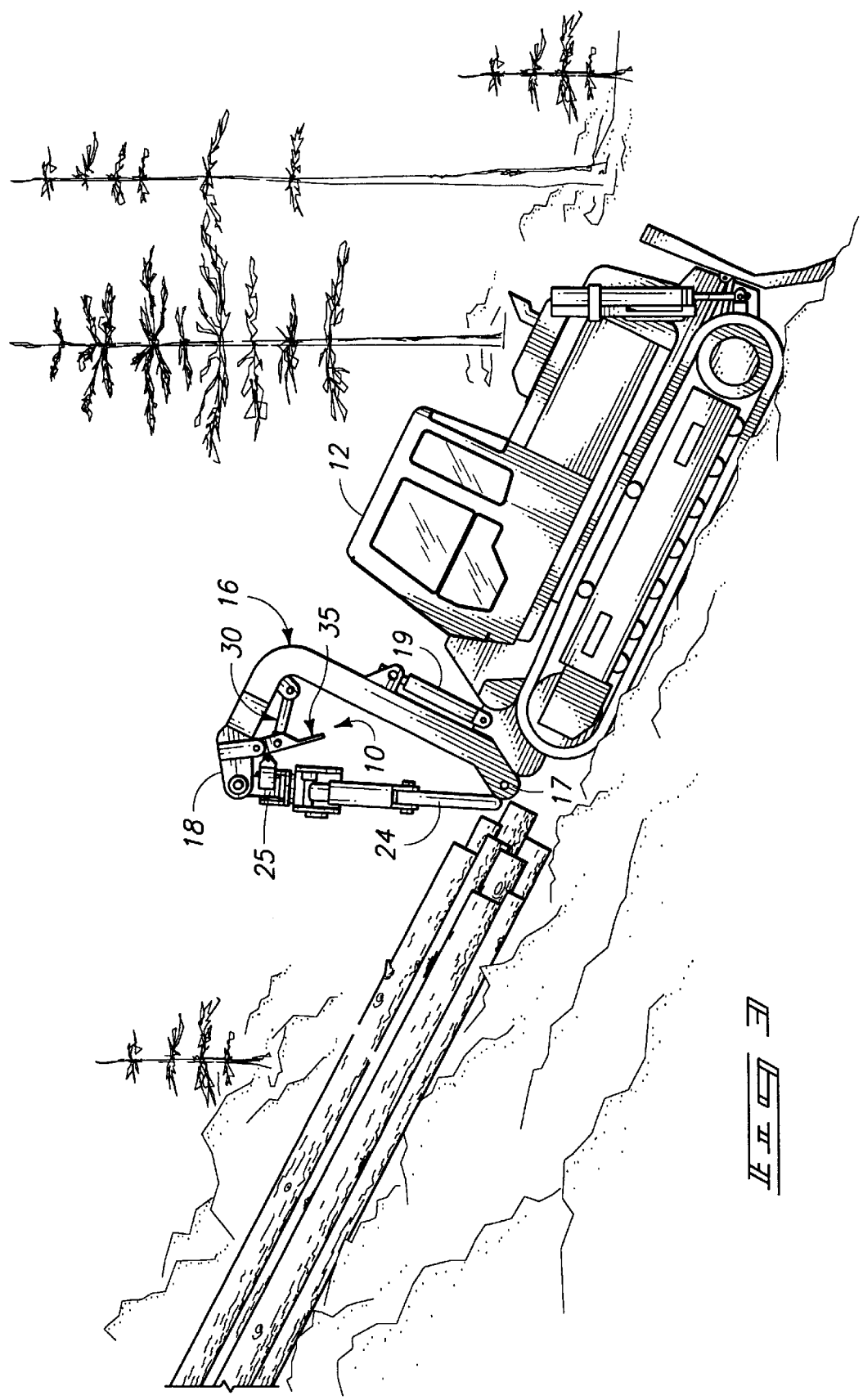
FIG. 3 is a view demonstrating the difficulty experienced when the grapple is allowed to swing freely and the vehicle is on an inclined surface.

The boom 16 extends upwardly from the one end 17 to the outer or upper end 18 which may be made to pivot by extension and retraction of the ram 19 toward or away from the tractor 12. As shown, the upper end of the boom is angled rearwardly to distance the grapple 14, including a pair of grapple hooks 24 from the tractor even when the boom is tipped as shown in FIG. 3.

The pivot link 25 is mounted to the boom end 18 to freely suspend the grapple 14. The link is similar to a universal joint, including a central yoke 26 that defines a number of intersecting axes. Thus, the exemplified pivot link includes the yoke 26 with a first horizontal cross pin 26a defining a horizontal axis A (see FIGS. 5 and 6). The yoke also includes a second horizontal cross pin 26b mounting the grapple. The first, second and third axes X, Y, and Z briefly described above are preferably parallel to the horizontal axis A.

Further, the pivot axes A and B defined by cross pins 26a, 26b lie in intersecting planes (pivot axis A being substantially perpendicular to pivot axis B). Preferably, the follower 41 is mounted to the pivot link 25 adjacent the second horizontal cross pin 26b or, between the first cross pin 26a and the grapple 14.

A rotator 28 may also be provided, joining the pivot link 25 and grapple 14 to permit selective powered rotation of the grapple about a third axis C which intersects both axes A and B. The rotator 28 is a conventional device that allows the operator to selectively rotate the grapple hooks 24 about the axis C with respect to the pivot link 25 and tractor as may be noted in FIG. 7.

The exemplary grapple 14 includes hooks 24 that are pivoted toward and away from one another by means of grapple ram cylinders 27. The cylinders 27 may be operated to open the grapple hooks 24 to span a load, then to close and grip the load.

Figure 5:
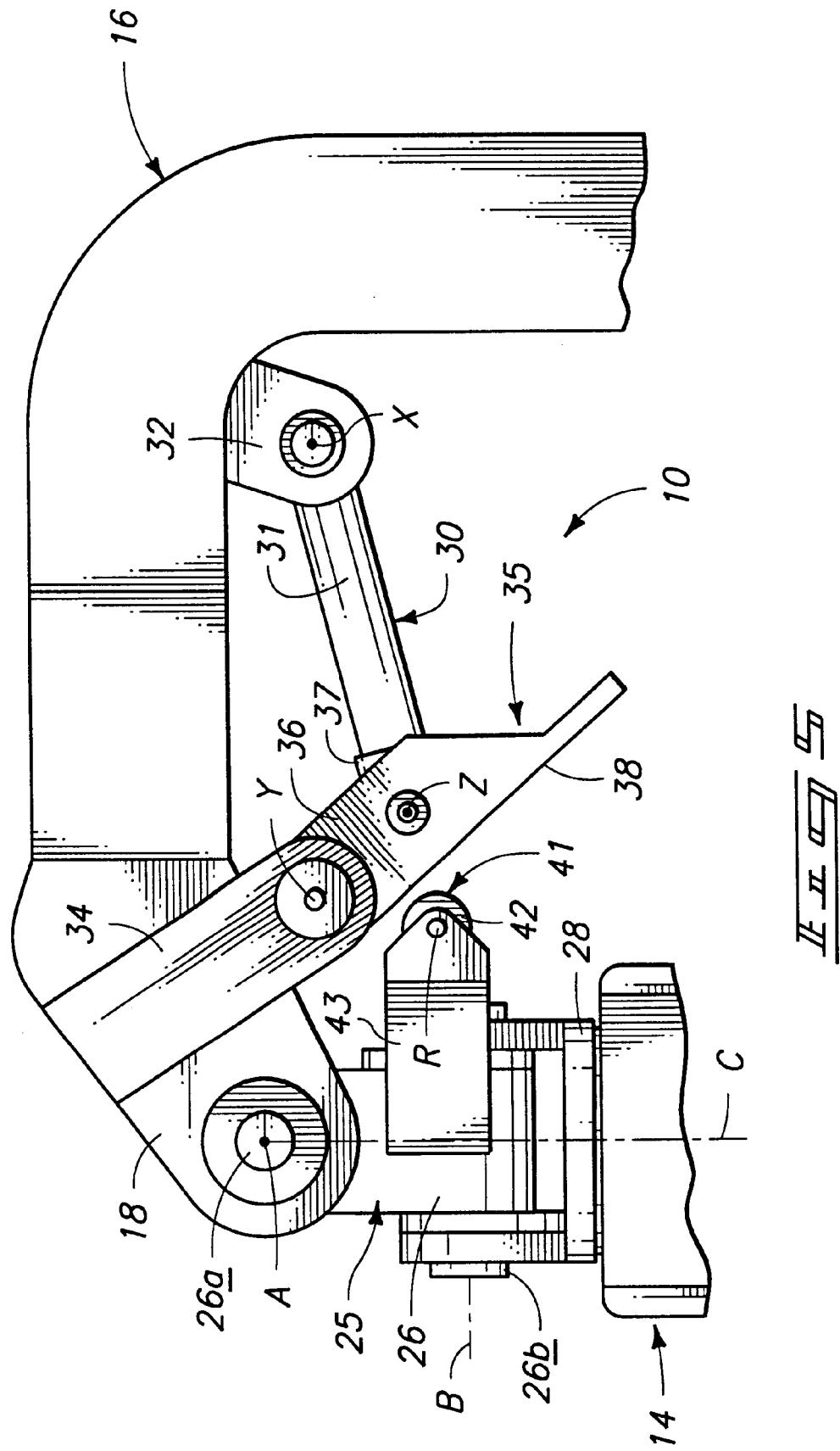
FIG. 5 is a fragmented side elevation view of the preferred grapple positioner with the pusher plate in a retracted inoperative position.
Figure 6:
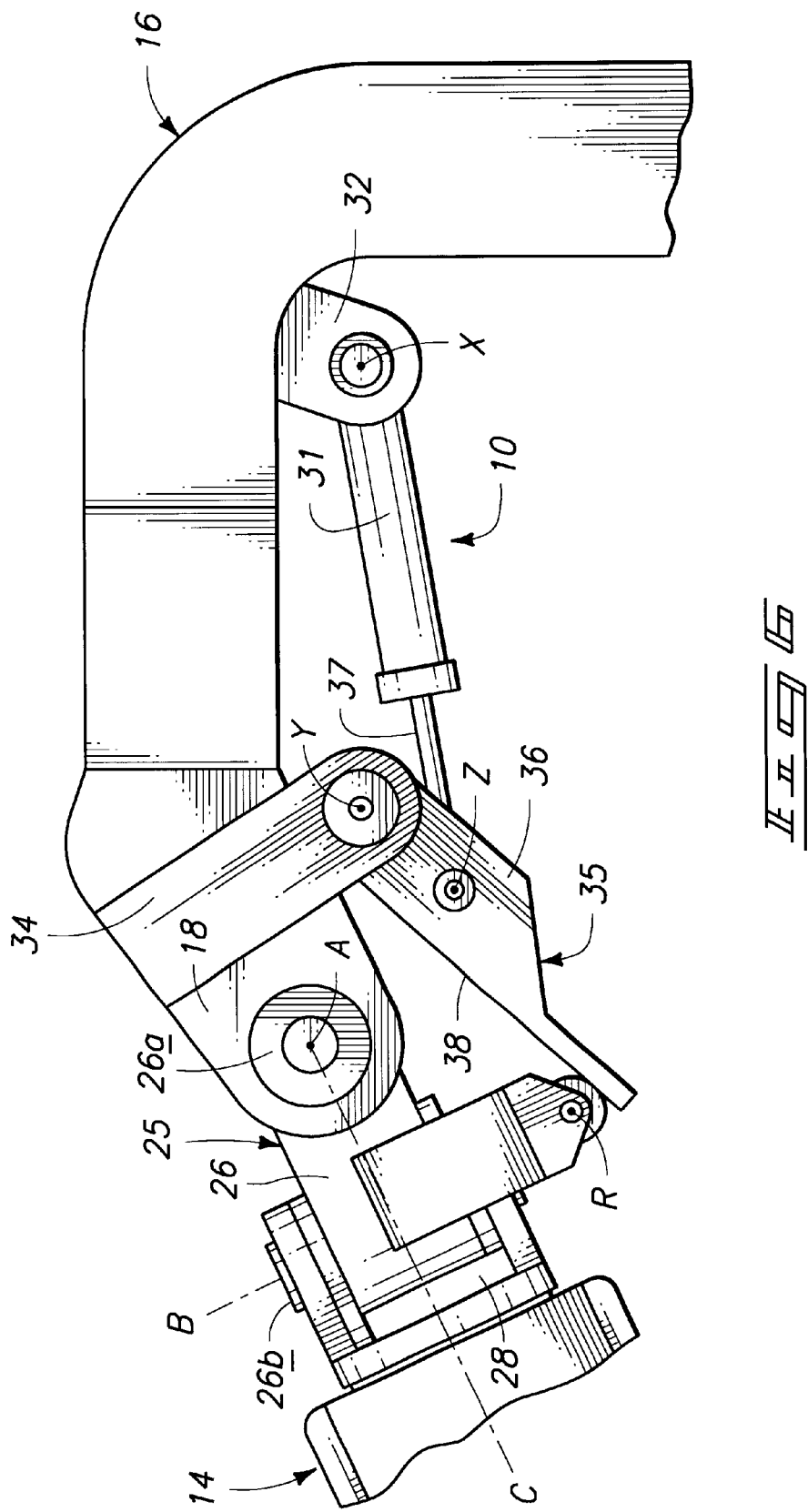
FIG. 6 is a view similar to FIG. 5 only shoeing the pusher plate in an extended operative position, and the corresponding angular position of the grapple.

Referring now in greater detail to a preferred form of the present grapple positioning device 10, attention is drawn to FIGS. 5 and 6 of the drawings. The basic components of the device, as an attachment to an existing grapple and boom, are the ram 30, the pusher plate 35, and the follower 41.

The preferred ram 30 is a hydraulic ram cylinder, though it is conceivable that other linear actuators could be used. The ram includes the end 31 which is connected to the boom, and the opposed end 37 which is attached to the pusher plate 35. The ram 30 may be operated to retract to a longitudinally compact condition as shown in FIG. 5, or to extend to an elongated condition as shown in FIG. 6. Thus, when moving to the retracted FIG. 5 position, the ram will function to move the pusher plate 35 away from the follower 41 and toward the boom. When moving to the extended FIG. 6 position, the ram will function to move the pusher plate toward the follower, to engage the follower and cause the grapple 14 to swing about axis A away from the boom.

A comparison of FIGS. 5 and 6 illustrate the above movement. FIG. 5 shows the cylinder 30 fully retracted. The follower 41 and pusher plate 35 are disengaged and the grapple is free to pivot, primarily axis A. FIG. 3 shows the resulting position of the grapple when the tractor is inclined. Note the difficult position of the grapple hooks to grasp the load.

Pivoting the boom 16 by extension of the cylinder 19 will not greatly improve the above situation since the result is that only the forward end of the load may be engaged and then only with the hooks in the loosely suspended vertical orientation shown.

Figure 4:
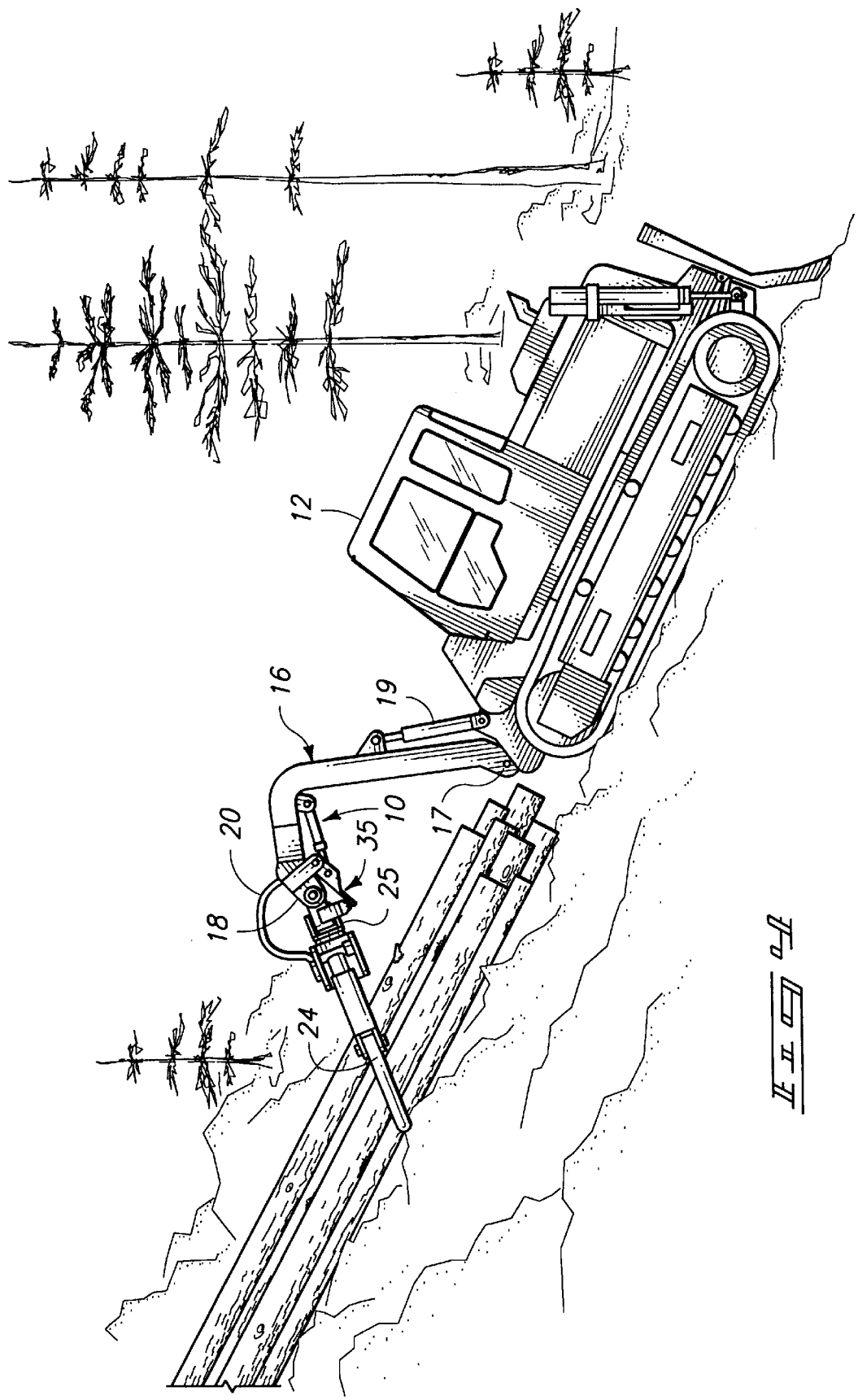
FIG. 4 is a view demonstrating use of the preferred grapple positioner to swing the grapple uphill toward the load of logs and thereby increase the reach of the associated boom.

Now refer to FIG. 6 which shows the cylinder 30 extended. Here, the pusher plate 35 is pivoted outwardly to engage the follower 41 and force the grapple hooks 24 to swing outwardly. This orientation is also shown in FIG. 4. The grapple 14 is pivoted outwardly to a position where the adjacent load may be easily gripped between the grapple hooks 24.

The ram 30 may be connected by conventional hydraulic lines into the existing hydraulics for the grapple. In fact, the connection may be made in the existing hydraulic circuit used for opening and closing the grapple hooks 24. The connection may be made in such a manner that when the grapple cylinders 27 are operated to open the grapple hooks, the ram 30 will be operated to extend, swinging the grapple outwardly. The cylinder 30 will then retract when the grapple hooks are closed to grip a load.

Alternatively, the ram 30 could be connected in a separate conventional hydraulic circuit with known controls for selective use by the operator to swing the grapple outwardly of the boom. The operator would then have the option of extending and retracting the grapple independently of the open or closed condition of the grapple hooks. The above and still further alternate connections might also be derived by those of ordinary skill in fluid power system design.

Preferred forms of the pusher plate 35 are mounted to the boom by the second bracket 34. The bracket 34 is preferably affixed to the boom between the boom end 18 and the first bracket 32, and projects downwardly therefrom. The bracket 34 also defines the second axis Y which is most preferably parallel to the first horizontal axis A about which the grapple hooks swing.

Pusher plate 35 is preferably formed of a rigid plate with a top end pivotably mounted to the bracket 34 for movement about the second axis Y. The pusher plate will thus pivot in an arc to engage and disengage the follower 41.

The preferred pusher plate 35 includes the mount 36 for the second end of ram cylinder 30. Mount 36 may simply be comprised of raised flanges on one side of the plate, with mounting holes formed therein which form the connecting point for the ram end 37. The holes define and locate the axis Z to preferably be parallel to axes X, Y, and A.

The preferred pusher plate 35 also includes a flat planar follower engaging surface 38. The surface 38 extends along the length of the plate for rolling engagement with the follower 41. As the plate pivots outwardly toward the grapple hooks, the surface will engage the follower. Continued motion of the plate will result in the follower rolling down the surface 38 as the grapple hooks swing upward about the axis A (compare FIGS. 5 and 6).

The follower 41 preferably includes a roller 42 that is rotatably mounted to a bracket 43 which, in turn, is mountable to the grapple. In a most preferred form, the bracket 43 is affixed to the yoke part 26 of the pivot link 25. It is preferred that the roller 42 be freely rotatable about a roller axis R (FIGS. 5 and 6) that is parallel to the axes X, Y, and Z. The bracket and roller 42, mounted in this position, permit free movement of the grapple hooks 24 about the axis B and about the rotation axis C when the ram cylinder is fully retracted. The bracket and roller also function to pivot the hooks 24 about the axis A upon extension of the ram 30 and consequent engagement by the pusher plate 35. It is noted that even with the roller 42 and pusher plate engaged, the grapple hooks remain capable of rotation about axes B and C.

Operation of the present grapple positioning device 10 will be given assuming the device to be mounted to a grapple assembly as shown in FIG. 1, and with the hydraulics for the device connected to the tractor hydraulics so that opening of the grapple hooks 24 will result in extension of the ram 30 to raise the grapple hooks. Given the above, operation will be discussed with respect to FIGS. 3 and 4.

The operator may maneuver the tractor to locate the grapple hooks at a position adjacent to a load such as the logs shown in FIG. 3. The grapple hooks 24 will swing freely during this time. If not for the present device 10, the operator would only have the option of extending the cylinder 19 to increase the reach of the grapple hooks. Even with the cylinder 19 extended and the boom lowered to its full reach, the hooks would remain in the free-swinging relation and limit the effective reach. However, with the present device 10, simple opening of the grapple hooks 24 will result in extension of the ram cylinder 30 and resulting extension of the hooks to the position shown in FIG. 4 of the drawings.

As the grapple hooks open, the ram 30 extends to move the pusher plate against the follower 41. Continued extension of the ram as the hooks open will result in the pusher plate acting against the follower to raise the grapple hooks angularly outwardly about the axis A, to the full reach of the grapple assembly (FIGS. 4 and 6). As may be seen, the reach with the present device 10 is significantly greater than what previously would have been available with conventional freely suspended grapple hooks, even with the boom extended.

Once the hooks are astride the load, the operator may cause the grapple hooks to close. The load is thus gripped between the opposed hooks. At the same time, the ram cylinder 30 is operated to retract, pulling the pusher plate back toward the boom and disengaging the follower. The grapple hooks are now free to pivot about the axis A as the tractor is maneuvered to pull the load to a desired location. It is noted that the hooks are now already in the same angular position (FIG. 4) that would normally be assumed when the tractor is driven forwardly. Thus there is little chance for loss of logs that have been unevenly distributed lengthwise in the load.

The above is contrary to previous practice where freely suspended grapple hooks must be closed on very end of the load (see FIG. 3). Without having the advantage of the present positioning device, and assuming the cylinder 19 to be extended from the FIG. 3 condition to bring the grapple hooks over the end of the load, the hooks would still be loosely suspended in the vertical mode shown. Then when the hooks are closed, with the hooks still vertical, the end of the load will be gripped. As the tractor moves forward, the hooks will shift or pivot from the vertical position, to an angled position, where it is quite possible that some of the unevenly stacked logs will escape the grip and slide off the load as the tractor moves forwardly. The present positioning device, as shown in FIG. 4, solves this problem in most cases. The reach of the grapple is not only significantly extended to allow gripping of loads previously unreachable by freely suspended grapple hooks, but the hooks will be in the towing position when closed on the load, thus minimizing loss of logs from the load as the tractor is moved forwardly.

When the load has been moved to a desired location, the grapple cylinders may be actuated to open. The cylinder 30, being connected in the same hydraulic lines, will extend, lifting the opening grapple hooks clear of the load.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A grapple positioning device for attachment to a grapple and boom wherein the grapple is pivotably mounted to an end of the boom, comprising:
    an extensible ram having one end mountable to the boom and extending to a pusher plate at a second end;
    a follower mountable to the grapple; and
    wherein the ram is operable to extend and move the pusher plate against the follower and thereby pivot the grapple away from the boom, and to retract to move the pusher plate in a direction toward the boom and away from the follower.

2. A grapple positioning device as defined by claim 1 wherein the ram is a hydraulic cylinder.

3. A grapple positioning device as defined by claim 1 wherein the pusher plate and ram are pivotably mountable to the boom, with the pusher plate being pivotable in an arc to engage and disengage the follower.

4. A grapple positioning device as defined by claim 1 wherein the follower is a freely rotatable roller mountable by a bracket to the grapple.

5. A grapple positioning device as defined by claim 1 wherein the pusher plate and ram are pivotably mountable to the boom, with the pusher plate being pivotable in an arc to engage and disengage the follower; and wherein the follower is a freely rotatable roller mountable by a bracket to the grapple.

6. A grapple positioning device as defined by claim 1 wherein:
    the pusher plate and ram are pivotably mountable to the boom with the pusher plate being pivotable in an arc to engage and disengage the follower;
    the follower is a freely rotatable roller mountable by a bracket to the grapple; and
    the pusher plate, ram, and roller rotate individually about axes that are parallel.

7. A grapple positioning device for attachment to a grapple and boom wherein the grapple is mounted to an end of the boom by a pivot link, comprising:

a follower mountable to the grapple;

a pusher plate an extensible ram mountable at one end to the boom and extending to a second end mounted to the pusher plate, the ram being operable to move the second end in a path between an extended position to engage the pusher plate with the follower and a retracted position to enable disengagement of the pusher plate and the follower; and whereby extension of the ram causes motion of the pusher plate to engage the follower and pivot the grapple away from the boom, and retraction of the ram causes motion of the pusher plate in a direction away from the follower.

8. A grapple positioning device as defined by claim 7 wherein the ram is a hydraulic cylinder.

9. A grapple positioning device as defined by claim 7 further comprising a bracket mountable to the pivot link and wherein the follower is mounted to the bracket.

10. A grapple positioning device as defined by claim 7 wherein the ram pivots about a first axis at the one end thereof and wherein the follower is comprised of a roller that rotates about an axis that is substantially parallel to the first axis.

11. A grapple positioning device as defined by claim 7 wherein the pusher plate is mountable to the boom for movement about a second pivot axis.

12. A grapple positioning device as defined by claim 7 wherein the ram pivots about a first axis at the one end thereof and the pusher plate is mountable to the boom for movement about a second pivot axis.

13. A grapple positioning device as defined by claim 7 wherein the ram pivots about a first axis at the one end thereof and the pusher plate is mountable to the boom for movement about a second pivot axis, and wherein the second axis is substantially parallel to the first axis.

14. A grapple positioning device attached to a grapple and boom wherein the grapple is mounted to an end of the boom by a pivot link, comprising:

a first bracket mounted to the boom and defining a first axis;

an extensible ram mounted at one end to the first bracket for pivotal movement about the first axis and extending to a second end;

a second bracket mounted to the boom adjacent to the boom end and defining a second axis;

a pusher plate mounted to the second bracket for movement about the second axis and including a mount thereon defining a third axis pivotably mounting the second end of the extensible ram;

whereby extension and retraction of the ram causes pivotal motion of the pusher plate about the second axis between a retracted position disposed angularly about the second axis toward the boom and an extended position disposed angularly about the second axis away from the boom; and a follower mounted to the pivot link and releasably engageable with the pusher plate to swing the grapple away from the boom in response to pivotal motion of the pusher plate to the extended position.

15. A grapple positioning device as defined by claim 14 wherein the first, second, and third axes are substantially parallel.

16. A grapple positioning device as defined by claim 14 wherein the follower is comprised of a roller mounted to the pivot link for rotation about a roller axis and wherein the first, second, third and roller axes are substantially parallel.

17. A grapple positioning device as defined by claim 14 wherein the pivot link includes a yoke with a first horizontal cross pin mounting the yoke to the boom for pivotal motion about a horizontal axis, and wherein the follower is mounted to the yoke.

18. A grapple positioning device as defined by claim 14 wherein the pivot link includes a yoke with a first horizontal cross pin mounting the yoke to the boom for pivotal motion about a horizontal axis, and a second horizontal cross pin mounting the grapple, the cross pins defining intersecting pivot axes, and wherein the follower is mounted to the yoke adjacent the second horizontal cross pin.

19. A grapple positioning device as defined by claim 14 wherein the pivot link includes a yoke with a first horizontal cross pin mounting the yoke to the boom for pivotal motion about a horizontal axis and a second cross pin mounting the yoke to the grapple; and wherein the first, second and third axes are parallel to the horizontal axis, and the cross pins define intersecting pivot axes, and wherein the follower is mounted to the pivot link adjacent the second cross pin.

20. A grapple positioning device as defined by claim 14 wherein the pivot link includes a yoke with a first horizontal cross pin mounting the yoke to the boom for pivotal motion about a horizontal axis, and a second horizontal cross pin mounting the grapple; and wherein the first, second and third axes are parallel to the horizontal axis, the cross pins defining intersecting pivot axes, and wherein the follower is mounted to the pivot link between the first cross pin and the grapple.

* * * * *